United States Patent [19]

Komatsu et al.

[11] Patent Number: 5,178,647
[45] Date of Patent: Jan. 12, 1993

[54] WEAR-RESISTANT MEMBER

[75] Inventors: Michiyasu Komatsu, Yokohama; Tadashi Miyano, Sagamihara; Syoji Okada, Yokohama; Shun-ichiro Tanaka, Yokohama; Kazuo Ikeda, Yokohama; Akio Sayano, Yokohama, all of Japan

[73] Assignee: Kabushiki Kaisha Toshiba, Kawasaki, Japan

[21] Appl. No.: 762,081

[22] Filed: Sep. 19, 1991

Related U.S. Application Data

[63] Continuation of Ser. No. 668,322, Mar. 14, 1991, abandoned, which is a continuation of Ser. No. 419,005, Oct. 10, 1989, abandoned, which is a continuation of Ser. No. 170,093, Mar. 9, 1988, abandoned, which is a continuation of Ser. No. 21,587, Mar. 2, 1987, abandoned, which is a continuation of Ser. No. 894,749, Aug. 11, 1986, abandoned, which is a continuation of Ser. No. 634,496, Jul. 26, 1984, abandoned.

[30] Foreign Application Priority Data

Jul. 29, 1983 [JP] Japan ................. 58-139270

[51] Int. Cl.⁵ .............................. B24D 3/06
[52] U.S. Cl. ..................... 51/307; 51/309; 501/87; 501/97; 501/98; 428/627; 428/660; 428/698
[58] Field of Search ............ 501/87, 93, 97, 98, 501/152; 264/60; 428/660, 627, 698, 699; 51/307, 309

[56] References Cited

U.S. PATENT DOCUMENTS

| | | | |
|---|---|---|---|
| 1,887,373 | 11/1932 | Emmons et al. | 408/144 OR |
| 2,857,663 | 10/1958 | Beggs | 428/656 X |
| 3,063,144 | 11/1962 | Palmour . | |
| 3,215,555 | 11/1965 | Krey | 427/377 X |
| 3,620,799 | 11/1971 | Hoelscher et al. | 427/377 X |
| 3,667,099 | 6/1972 | Palmer | 428/557 OR |
| 3,808,044 | 4/1974 | Hofmann | 427/399 X |
| 4,127,416 | 11/1978 | Lumby et al. | 501/152 X |
| 4,252,768 | 2/1981 | Perkins et al. | 501/87 X |
| 4,323,323 | 4/1982 | Lumby et al. | 501/97 X |
| 4,424,066 | 1/1984 | Sarin et al. | 501/98 X |
| 4,426,209 | 1/1984 | Sarin et al. | 501/98 X |

(List continued on next page.)

FOREIGN PATENT DOCUMENTS

| | | | |
|---|---|---|---|
| 0071997 | 2/1983 | European Pat. Off. | 501/97 |
| 0073523 | 3/1983 | European Pat. Off. . | |
| 0152488 | 8/1985 | European Pat. Off. . | |
| 149175 | 11/1980 | Japan | 501/98 |

(List continued on next page.)

OTHER PUBLICATIONS

Chem. Abstracts vol. 99, 1983, p. 266 Abstract No. 109667t.
Chem. Abstracts vol. 99, 1983, p. 302 Abstract No. 144945d.
Chem. Abstracts vol. 99, 1983, p. 283 Abstract No. 92720e.
Chem. Abstracts vol. 99, 1983, p. 283 Abstract No. 92718k.

(List continued on next page.)

Primary Examiner—Karl Group
Attorney, Agent, or Firm—Cushman, Darby & Cushman

[57] ABSTRACT

A wear-resistant member formed comprises a sintered ceramic body essentially consisting of 0.1 to 15% by weight of at least one material selected from the group comprising molybdenum carbide, niobium carbide, hafnium carbide, tantalum carbide, tungsten carbide, molybdenum silicide, niobium silicide, hafnium silicide, tantalum silicide, tungsten silicide, molybdenum boride, niobium boride, hafnium boride, tantalum boride, and tungsten boride, 2 to 20% by weight of a boundary phase selected from the group consisting of Si—Y—Al—O—N and Si—Y—Al—O—N—B, and a balance of β-silicon nitride. The wear-resistant member preferably has a metal member bonded to the sintered ceramic body. The wear-resistant member can perform high-load work such as high-speed cutting.

2 Claims, 2 Drawing Sheets

U.S. PATENT DOCUMENTS

| | | | |
|---|---|---|---|
| 4,448,853 | 5/1984 | Fischer et al. | 428/660 X |
| 4,471,026 | 9/1984 | Nicholas et al. | 420/473 X |
| 4,506,020 | 3/1985 | Butler et al. | 501/98 X |
| 4,547,470 | 10/1985 | Tanase et al. | 501/93 X |
| 4,614,689 | 9/1986 | Ikeda et al. | 428/409 OR |
| 4,624,897 | 11/1986 | Ito | 428/660 X |
| 4,740,429 | 4/1988 | Tsuno | 428/660 X |

FOREIGN PATENT DOCUMENTS

| | | | |
|---|---|---|---|
| 0017466 | 1/1982 | Japan | 501/97 |
| 58-64269 | 4/1983 | Japan. | |
| 58-64271 | 4/1983 | Japan. | |
| 58-64273 | 4/1983 | Japan. | |
| 58-95655 | 6/1983 | Japan. | |
| 0151371 | 10/1983 | Japan | 501/98 |
| 1365126 | 8/1971 | United Kingdom. | |

OTHER PUBLICATIONS

Chem. Abstracts vol. 99, 1983, p. 241 Abstract No. 9798t.

Chem. Abstracts vol. 93, 1980, p. 285 Abstract No. 154757j.

Chem. Abstracts vol. 97, 1982, p. 329 Abstract No. 77530h.

Chem. Abstracts vol. 95, 1981, p. 276 Abstract No. 11515j.

*The Condensed Chemical Dictionary*, Eighth Edition, p. 525 (1971).

Journal of Japan Society of Metallurgy, vol. 22, No. 1 (1983) The Characterization of Ceramic/Metal Systems Joined by an Active-Metal Brazing Method—Shun-ichiro Tanaka—New Material Engineering Lab., Toshiba Corporation.

WEAR-RESISTANT MEMBER

This is a continuation of application Ser. No. 07/668,322, filed Mar. 14, 1991, which was a continuation of Ser. No. 07/419,005 filed Oct. 10, 1989, which was a continuation of Ser. No. 07/170,093 filed Mar. 9, 1988, which was a continuation of Ser. No. 07/021,587 filed Mar. 2, 1987, which was a continuation of Ser. No. 06/894,749 filed Aug. 11, 1986, which was a continuation of Ser. No. 06/634,496 filed Jul. 26, 1984, all abandoned.

BACKGROUND OF THE INVENTION

The present invention relates to a wear-resistant member formed of a sintered ceramic body of a silicon nitride-based ceramic and a manufacturing method thereof.

Since a sintered ceramic body, in particular, an $Si_3N_4$-based sintered ceramic body, exhibits good mechanical characteristics at high temperatures, it is conventionally used as a material for various structures.

However, such a sintered ceramic body does not exhibit sufficient resistance against wear and fracture. Therefore, sintered ceramic bodies are merely used as wear-resistant members such as a bearing or a cutting tool. Further if such a sintered ceramic body is used as such a member, the sintered ceramic body does not have a sufficient tool life.

On the other hand, cutting tools conventionally manufactured by integrally brazing a hard-metal chip to a shank or by clamping it thereto, cannot be used for high-speed cutting or high-load work such as grooving of a wood material.

SUMMARY OF THE INVENTION

It is an object of the present invention to provide a wear-resistant member comprising a sintered ceramic body which can perform high-load work and a manufacturing method thereof.

According to one aspect of the present invention, there is provided a wear-resistant member comprising a sintered ceramic body essentially consisting of 0.1 to 15% by weight of at least one material selected from the group comprising carbides, silicides and borides of molybdenum (Mo), niobium (Nb), hafnium (Hf), tantalum (Ta), and tungsten (W), 2 to 20% by weight of a boundary phase selected from the group consisting of Si—Y—Al—O—N and Si—Y—Al—O—N—B, and a balance of $\beta$-silicon nitride.

Another aspect of the invention, provides a wear-resistant member formed by bonding a sintered ceramic body to a metal member.

DETAILED DESCRIPTION OF THE PREFERRED EMBODIMENTS

According to the present invention, when content of at least one material selected from the group consisting of carbides, silicides and borides of Mo, Nb, Hf, Ta, and W is less than 0.1% by weight, a hardness, wear-resistance, and bending strength of an obtained sintered ceramic body cannot be sufficiently improved. On the other hand, when the content of the material described above is greater than 15% by weight, a value ($K_IC$) of the fracture resistance is lowered, and mechanical strength of the sintered ceramic body is also lowered. Therefore, the content of the material described above must fall within the range as described above.

When the content of a boundary phase formed of Si—Y—Al—O—N or Si—Y—Al—O—N—B which constitutes a sintered ceramic body of the present invention is lower than 2% by weight, it is difficult to sufficiently sinter the $Si_3N_4$. However, when the content of the boundary phase is greater than 20% by weight, the mechanical strength and heat/impact resistance of the sintered ceramic body are lowered. Therefore, the content of the boundary phase must fall within the range as described above.

The content of $\beta$-silicon nitride is based on the balance of the total weight of the sintered ceramic body, obtained by substracting the percentage contents of the above two components from 100% by weight, and is preferably greater than 70% by weight.

A method of manufacturing a wear-resistant member of the present invention comprises the steps of:

1. preparing a powder mixture essentially consisting of a 0.1 to 10% by weight of at least one material selected from the group consisting of molybdenum, niobium, hafnium, tantalum, tungsten, carbides, silicides and borides thereof, b 0.5 to 20% by weight of a sintering accelerator consisting of yttrium oxide and aluminum oxide, and C. a balance of $\alpha$-silicon nitride; and 2. sintering the powder mixture at a temperature of 1,600° to 1,800° C. and a pressure of 50 to 500 kg/cm² for 30 to 120 minutes in a mold to obtain a sintered ceramic body.

Another method of manufacturing a wear-resistant member of the present invention comprises the steps of:

1. molding the powder mixture described above into a predetermined shape, and 2. sintering the molded mixture in a non-oxidizing atmosphere at a temperature of 1,700° to 1800° C. for 60 to 120 minutes to obtain the sintered ceramic body after preparing the powder mixture.

In order to increase a density of the sintered ceramic body, the powder mixture can contain 0.1 to 10% by weight of AlN or 0.1 to 5% by weight of $TiO_2$.

Figure 1:
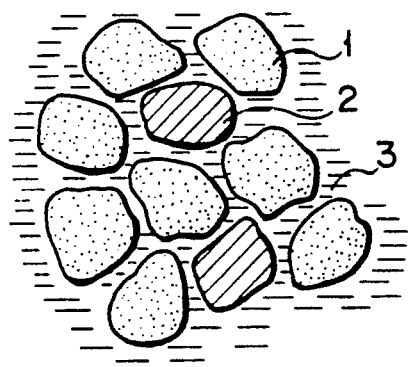
FIG. 1 is a representation showing a component of a sintered ceramic body which constitutes a wear-resistant member according to an embodiment of the present invention.

FIG. 1 schematically shows a sintered ceramic body of an embodiment according to the present invention. In FIG. 1, reference numerals 1 and 2 respectively denote $Si_3N_4$ particles and $MoSi_2$ particles. A boundary phase 3 is formed between these particles 1 and 2. Components, e.g., Y, Al and O constituting the boundary phase 3, are supplied from $Y_2O_3$ and $Al_2O_3$, which are used as sintering accelerators.

The wear-resistant member according to the present invention, formed of the sintered ceramic body shown in FIG. 1, has not only good mechanical strength and high heat/impact resistance, but also a good wear resistance. The wear-resistant member can be effectively used as, e.g., a bearing, a cutting tool, a metal processing tool, and the like. Since the wear-resistant member has good wear resistance at high temperatures, it is preferably employed in a jig used for welding. Furthermore, if the wear-resistant member is bonded to a metal member, it can be used as a cutting tool which can perform high-load work.

In the case wherein the sintered ceramic body is bonded to a metal member, in particular, to a steel member to prepare a cutting tool, the tool is prepared in the following manner.

The sintered ceramic body is first oxidized to form an oxide layer on a surface thereof, then an oxygen-containing copper such as tough pitch copper in contact with the oxide layer, forms a copper layer by heating to a temperature of 1,065° to 1,083° C. in an inert atmosphere, so that the sintered ceramic body is bonded to the metal member through the copper layer and solder. If a lithium molybdate solution having a titanium compound is coated on the sintered ceramic body, and heated to form a conductive layer comprising molybdenum silicide, and nickel plating is performed on the conductive layer, the sintered ceramic body is bonded to the metal member through the plated nickel layer and solder.

The sintered ceramic body can be bonded to a metal member by using a titanium powder or film. In this case, a ductile metal is sandwiched between the layers to serve as a buffer interlayer, thereby obtaining high strength.

The present invention will be described by the following examples.

EXAMPLE 1

85% by weight of α-type $Si_3N_4$, 5% by weight of $Y_2O_3$, 4% by weight of $Al_2O_3$, 3% by weight of AlN, and 3% by weight of $Mo_2C_3$ were mixed and pulverized by a ball mill to form a powder mixture. 7% by weight of paraffin was added to the obtained powder mixture as a binder. Thereafter, the resultant powder mixture was molded at room temperature at a molding pressure of 700 kg/cm$^2$ to obtain a plate-shaped body having a length of 100 mm, a width of 100 mm, and a thickness of 30 mm.

The obtained body was heated to a temperature of 700° C. to remove the binder. Thereafter, the resultant body was sintered in a nitrogen atmosphere at a temperature of 1,750° C. for 120 minutes so as to obtain the sintered ceramic body.

The obtained sintered ceramic body essentially consisted of 7.5% by weight of $MoSi_2$, 15% by weight of the boundary phase formed of Si—Y—Al—O—N, and the balance of β type $Si_3N_4$.

The obtained sintered ceramic body had a $K_IC$ value (MNm$^{-3/2}$) of 7.5, a bending strength of 100 kg/mm$^2$, and a wear amount (mm$^3$/kg.mm) of $1 \times 10^{-6}$.

For the purpose of comparison, another sintered ceramic body was formed following the same procedures as those of Example 1 except for the step of adding $MoSi_2$. This other obtained sintered ceramic body had a $K_IC$ value of 5.5, a bending strength of 85 kg/mm$^2$, and a wear amount (mm$^3$/kg.mm) of $5 \times 10^{-6}$.

EXAMPLE 2

Figure 2:
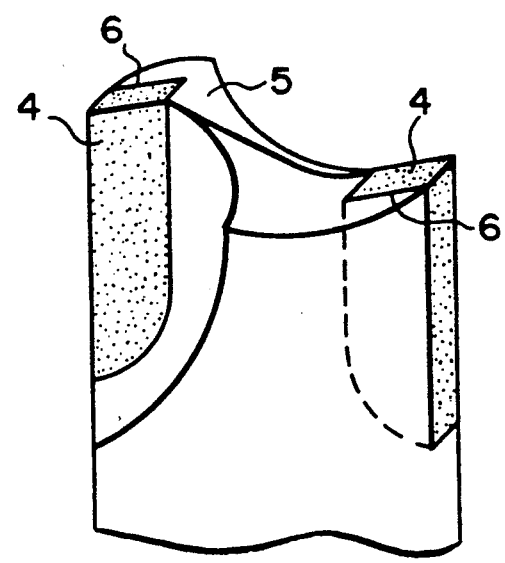
FIG. 2 is a perspective view of a wear-resistant member of another embodiment of the present invention.

A chip 4 of a sintered ceramic body was formed by using the same components and in the same manner as those of Example 1, as shown in FIG. 2. A lithium molybdate solution was coated on a surface chip 4 opposite to a metal member, and was heated to form a conductive layer thereon. Thereafter, a nickel plating layer was formed on the conductive layer.

Then, a steel member 5, molded in a predetermined form and being in contact with the nickel plating layer of the chip 4 through an Ag-Cu solder 6, was heated to be bonded thereto, thereby obtaining a wood work tool.

According to this wood work tool, work along a vertical direction with respect to fibers of a wood, which could not be performed by a conventional tool, could be easily performed at a feed speed of 1.5 m/min.

However, with a conventional cutting tool having a chip formed of 88% by weight of $Si_3N_4$ and 12% by weight of $Y_2O_3$-$Al_2O_3$-based glass, work along the direction described above was performed only at a feed speed of 0.7 m/min, and during this work, breakage thereof occurred. Furthermore, a conventional blade of a hard metal still had a low work efficiency of a feed speed of 0.28 m/min.

EXAMPLE 3

Figure 3:
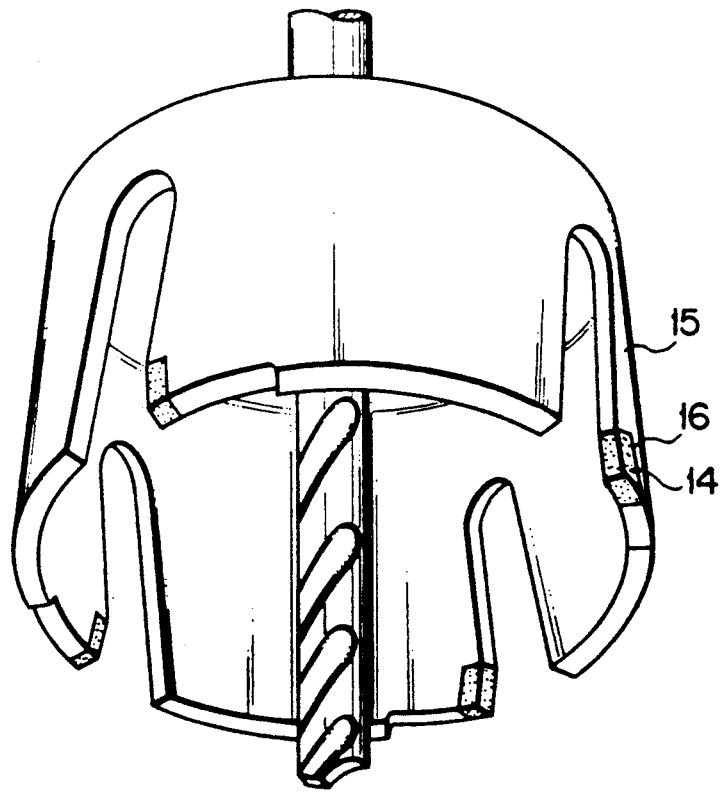
FIG. 3 is a perspective view of a structure having a wear-resistant member of a further embodiment.

A ceramic chip 14 shown in FIG. 3 was prepared by using the same components and in the same manner as those of Example 1. A powder mixture of titanium and copper was sandwiched between a surface of the chip 14 opposite to a metal member and a copper plate and was heated in an inert atmosphere to form a copper layer. Then, the copper layer was heated to be bonded to a tool holder 15 through an Ag-Cu solder 16 so as to obtain a hole cutter. By using this hole cutter, a hole could be formed in a carbon fiber reinforced plastic (CFRP) whereas a cutter having a conventional hard metal blade could not form a hole therein.

EXAMPLE 4

Figure 4:
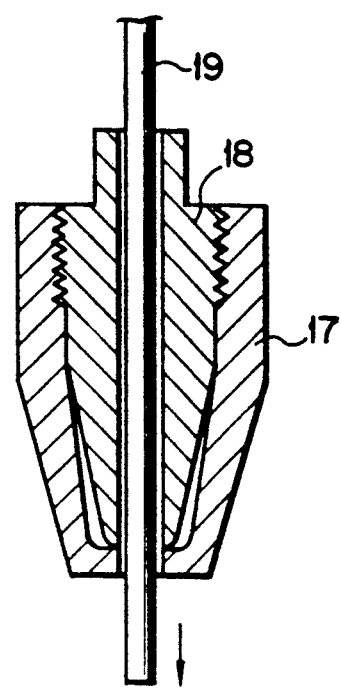
FIG. 4 is a sectional view of a structure of still another embodiment.

A welding chip cover 17 shown in FIG. 4 was formed by using the same components and in the same manner as those of Example 1. A copper alloy chip 18 was screwed into the chip cover 17. A welding wire 19 was slidably fitted in a central portion of the chip 18 and fed along an axial direction thereof. A chip cover must generally have high heat resistance, a high electric insulation performance (in the case of an MIG welding) and a good anti-baking property against a welding wire, in addition to having good wear resistance at high temperatures. The chip cover 17 according to the present invention improved these characteristics significantly. In this embodiment, $MoSi_2$, as one component of a sintered ceramic body, can particularly improve the heat/impact resistance and anti-baking property against the welding wire in addition to the wear resistance.

What is claimed is:

1. A cutting tool comprising:
    a) a cutting surface made of a sintered ceramic body, said sintered ceramic body consisting essentially of:
        1) 0.1 to 15% by weight of molybdenum silicide,
        2) 2 to 20% by weight of a boundary phase material selected from the group consisting of Si—Y—Al—O—N and Si—Y—O—N—B, wherein said molybdenum silicide is in the form of particles which are distinct from said boundary phase, and
        3) the balance being β-silicon nitride; wherein said cutting surface has a cutting side and a second side, said second side being a bonding surface;
    b) a bonding layer formed on said bonding surface of said cutting surface, said bonding layer containing titanium and copper, thereby enabling said cutting surface to be bonded to a metal surface; and c) a holder metal member having a fixing surface to which said cutting surface is fixed through said bonding layer.

2. A cutting tool comprising:

a) a cutting surface made of a sintered ceramic body, said sintered ceramic body essentially consisting of:
  1) 0.1 to 15% by weight of molybdenum silicide,
  2) 2 to 20% by weight of a boundary phase material selected from the group consisting of Si—Y—Al—O—N and Si—Y—O—N—B, wherein said molybdenum silicide is in the form of particles which are distinct from said boundary phase, and
  3) the balance being β-silicon nitride; wherein said cutting surface has a cutting side and a second side, said second side being a bonding surface;

b) a bonding layer formed on said bonding surface of said cutting surface, said bonding layer containing titanium and copper, thereby enabling said cutting surface to be bonded to a metal surface;

c) a ductile metal layer bonded to said bonding layer, wherein said ductile layer comprises copper; and d) a holder metal member having a fixing surface to which said cutting surface is fixed through said bonding layer and said ductile metal layer.

* * * * *